United States Patent [19]

Blair

[11] Patent Number: 4,472,806
[45] Date of Patent: Sep. 18, 1984

[54] SIGNAL SELECTION AND FAULT DETECTION APPARATUS

[75] Inventor: John D. Blair, Renton, Wash.

[73] Assignee: The Boeing Company, Seattle, Wash.

[21] Appl. No.: 373,952

[22] Filed: May 3, 1982

[51] Int. Cl.³ .................................................. G06F 11/20
[52] U.S. Cl. ........................................ 371/68; 318/564
[58] Field of Search ....................... 371/68, 36, 62, 11, 371/4; 318/564

[56] References Cited

U.S. PATENT DOCUMENTS

| | | | |
|---|---|---|---|
| 3,054,039 | 9/1962 | Meredith | 318/564 |
| 3,145,330 | 8/1964 | Hecht | 318/564 |
| 3,190,586 | 6/1965 | Righton | 318/564 |
| 3,334,282 | 8/1967 | Wolfe | 318/564 |
| 3,469,162 | 9/1969 | Goslin | 318/564 |
| 3,496,836 | 2/1970 | Jenney | 91/509 |
| 3,551,776 | 12/1970 | Tawfik et al. | 318/564 |
| 3,573,587 | 4/1971 | Bishop et al. | 318/564 |
| 3,686,493 | 8/1972 | Schmid | 318/564 |
| 3,805,235 | 4/1974 | Foster et al. | 371/68 |
| 3,979,720 | 9/1976 | Laas et al. | 318/564 |
| 4,101,958 | 7/1978 | Patterson et al. | 364/200 |
| 4,105,900 | 8/1978 | Martin et al. | 318/564 |
| 4,276,648 | 6/1981 | Tomlinson | 371/68 |

FOREIGN PATENT DOCUMENTS

| | | | |
|---|---|---|---|
| 1334531 | 10/1973 | United Kingdom. | |
| 396011 | 8/1973 | U.S.S.R. | 318/564 |

Primary Examiner—David H. Malzahn
Attorney, Agent, or Firm—Christensen, O'Connor, Johnson & Kindness

[57] ABSTRACT

Each of several redundant sensor signals is compensated with respect to a midvalue selected signal in equalizer circuitry. A midvalue selector selects the midvalue one of the compensated input signals. Fault detection circuitry identifies as a failure any compensated input signal which deviates from the midvalue selected signal by a specified limit and, in response thereto, isolates the identified signal and substitutes therefor as an input to the midvalue selector the selected midvalue signal.

8 Claims, 1 Drawing Figure

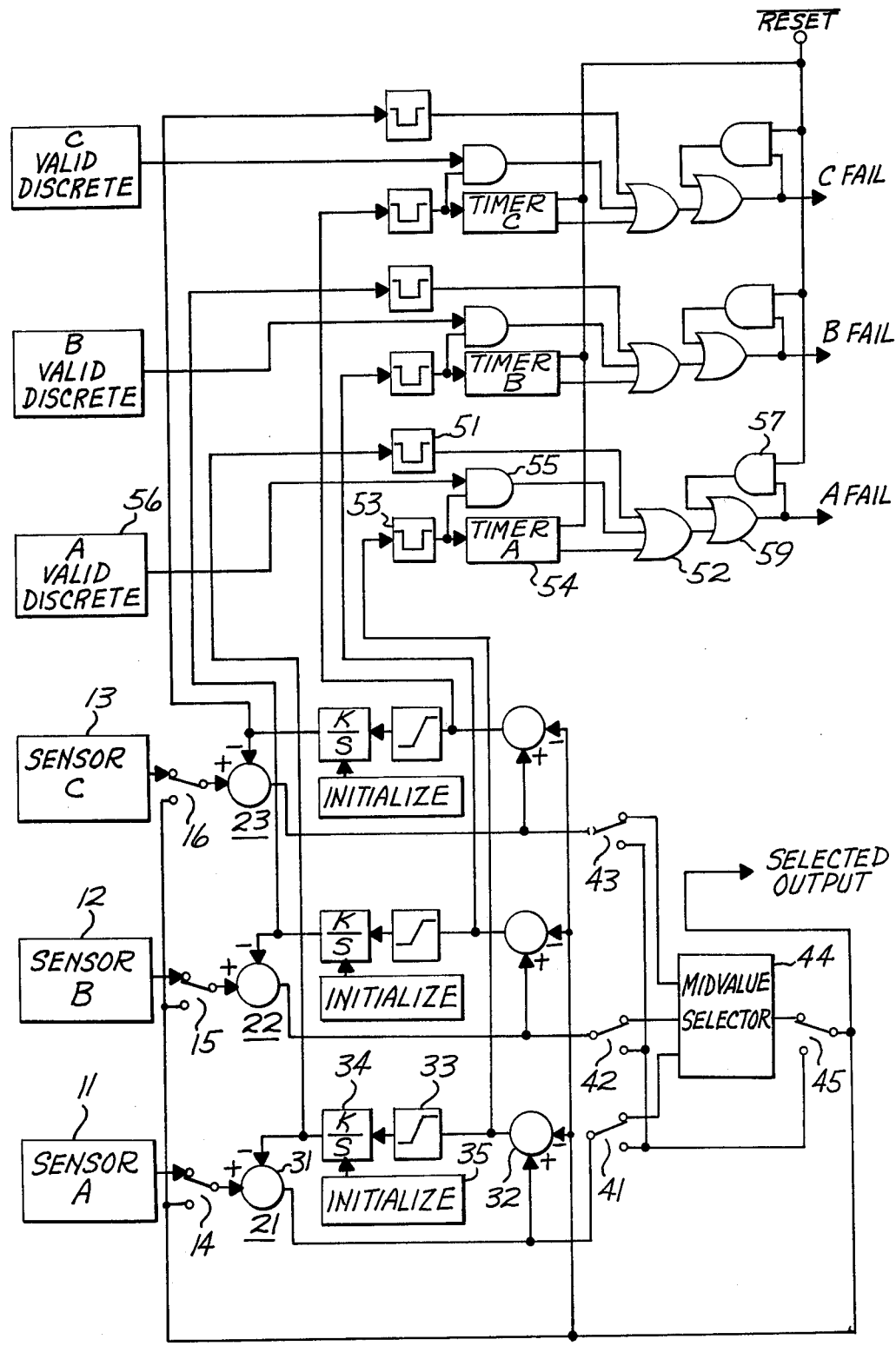

SIGNAL SELECTION AND FAULT DETECTION APPARATUS

BACKGROUND OF THE INVENTION

The present invention pertains to the signal processing art and, more particularly, to an improved apparatus for, and a method of redundant signal selection and fault detection and isolation.

Numerous redundant signal selection systems, which include fault detection and isolation, are known to the prior art. A particular application for such systems is in the aviation art, wherein several sensors, each sensing the same aircraft parameter, provide output data signals. Processing circuitry receives the data signals, and, in accordance with predetermined logic, selects that data signal, or combination of signals which is most likely to be representative of the acutual aircraft parameter. The output from the signal selection system is then used in aircraft control circuitry, such as the autopilot or autothrottle system.

Signal selection systems commonly employ fault detection and isolation circuitry. Such circuitry monitors the imput data signals and, in accordance with a fault detection algorithm, identifies and isolates that input data signal which exhibits a fault characteristic. To further enhance the ability of the fault detection system to isolate failures, it is known to provide equalization to all of the input data signals, thereby eliminating fixed offset errors existing between channels.

U.S. Pat. No. 4,276,648 describes one such signal selection and fault detection system. Here, multiple redundant sensor signals are processed through an equalizing and selecting network which outputs the midvalue signal and eliminates all null offsets occurring among signals. Faults of both low and high frequency are detected, resulting in the isolation of the appropriate signal channel.

Where triple redundant sensors are used, the above described prior art signal selection apparatus operates fail-passive after a second detected failure. That is, upon the failure of two of three signal channels, this system causes its output to be driven smoothly to zero, regardless of the signal produced by the remaining good channel.

In certain applications, it is preferable to remain operational after two or three failures. Thus, a system which is capable of positive fault identification of two of three channels, while continuing operation with the remaining good third channel, would fulfill a need in the signal processing art.

SUMMARY OF THE INVENTION

It is an object of this invention, therefore, to provide apparatus for, and a method of providing signal selector apparatus which includes fault detection and isolation circuitry capable of positively identifying and isolating each failed channel.

It is a further object of the invention to provide the above-described apparatus and method in a system which is fail operational following the failure of all but one channel.

Briefly, according to the invention, apparatus for selecting one of several input signals includes a plurality of equalizer channels with each equalizer channel processing one of the input signals and compensating the signal with respect to a midvalue selected signal. A midvalue selector, having a plurality of inputs and and output, with each input being coupled to one of the equalizer channels, produces at its output the midvalue one of the compensated input signals. Fault detector circuitry identifies as a fault each compensated input signal which deviates from the midvalue selected signal by a predetermined value. Once a fault is identified, the errant signal is isolated from the midvalue selector input and, substituted therefor, is the output signal from the midvalue selector.

The fault detector also includes a means for identifying the isolation of all identified compensated input signals save one from the inputs to the midvalue selector and, in response thereto, directly coupling the remaining compensated signal as the output from the signal selector apparatus.

The method for selecting one of several input signals comprises the first step of equalizing each input signal with respect to a midvalue selected signal and thereby producing a plurality of compensated input signals. Next, the midvalue one of the plurality of compensated input signals is midvalue selected. Each compensated input signal which deviates from the midvalue selected signal by a predetermined value is identified as a fault. Each fault identified compensated input signal is isolated from the midvalue selecting process and, substituted in its place, is the midvalue selected signal.

Further, the method includes identifying the condition of the isolation of all compensated input signals save one and providing the remaining compensated input signal as the selected output signal.

BRIEF DESCRIPTION OF THE DRAWING

The single FIGURE illustrates in block diagram form the preferred construction of the improved signal selection and fault detection and isolation system according to the invention.

DETAILED DESCRIPTION OF THE DRAWING

The FIGURE illustrates the preferred embodiment of the invention, adapted for triple redundant input sensors. Here, input data signals from each of three redundant sensors 11, 12 and 13 are passed through switching circuits 14, 15 and 16, respectively, to the inputs of three equalizing channels 21-23.

Inasmuch as the three equalizing channels 21-23 are identical, the discussion herein is limited to the first channel 21. The data signal from sensor 11 is passed to the input of a first summer circuit 31. Also coupled to an input of summer circuit 31 is a feedback signal which, as will be understood more thoroughly given the discussion hereinbelow, compensates the input signal with respect to a selected midvalue signal.

The selected midvalue signal is added, in the negative sense, to the compensated input signal at a second summer 32. The resultant signal from summer 32 is passed through a rate limiter 33 which, in the normal manner, limits the rate of change of an input signal to a given value. The output from limiter 33 is multiplied by a gain factor K and integrated in an integrator 34. Integrator 34 is initialized via initialize circuitry 35 to an initial value, such as zero, on system startup and upon failure of the channel.

The output from integrator 34 is the feedback signal which is applied to the summer 31. The feedback loop including the limiter 33 and the integrator 34 to the combiner 31 generates an error signal which, when added to the input signal, compensates the input signal with respect to the midvalue selected signal. In this manner, fixed offset biases, such as may be produced by offsets within sensors 11–13 are fully equalized. The use of limiter 33 permits the use of a relatively large gain K thereby increasing loop gain and ensuring good tracking while minimizing the effects of transient disturbances.

The compensated input signals which are produced at the outputs of the equalizing channels 21–23 are coupled through switches 41–43, respectively, to inputs of a midvalue selector 44. Midvalue selector 44 operates in the conventional manner to produce at its output that input signal which has a value between the remaining input signals.

The selected midvalue signal is passed through a switch 45 as the selected output of the signal selection system.

Fault detection is performed by monitoring the magnitude of the signals generated in each equalizer loop. Since the detection circuitry is identical for each loop, it will only be discussed with reference to the first channel 21.

The signal out of integrator 34 represents the steady-state difference between each input signal and the selected midvalue signal. The steady-state difference signal is passed to a threshold detector 51 which, in the conventional manner, produces a high-level output signal in response to the input difference signal exceeding a predetermined threshold level. The output from threshold detector 51 is applied as one input to an OR gate 52.

The signal out of the second combiner 32 represents the instantaneous difference between the input signal and the midvalue selected signal. The output from summer 32 is applied at an input of a threshold detector 53.

Threshold detector 53, in a manner similar to detector 51, produces a high-level output signal in response to the instantaneous difference signal exceeding a predetermined threshold. This high output signal is passed both to the input of a timer 54 and as one input to an AND gate 55. Also connected to an input of AND gate 55 is the output from a valid discrete circuit 56. Various sensors, such as sensor 11, may be provided with internal circuitry for determining whether or not the sensor has failed. This internal circuitry, such as valid discrete 56, produces a high-level output signal in response to a detected sensor failure. Thus, AND gate 55 is satisfied when both its valid discrete 56 and the threshold detector 53 indicate a failure. In this event, AND gate 55 applies a high-level output signal to an input of OR gate 52.

The final input to OR gate 52 is the output from the timer 54. Timer 54 produces a high output level in the event that the output from the threshold detector 53 indicates the existence of a fault condition for a sufficient period of time. Thus, a transient fault will not be of sufficient duration to cause timer 54 to produce a high-level output.

Upon receiving a high-level signal at any of its inputs, OR gate 52 produces a high-level output signal which is passed to an input of OR gate 59. The output from OR gate 59 is applied to one input of an AND gate 57, whose remaining input receives a reset input. The output from AND gate 57 is the remaining input to OR gate 59.

In operation, a steady-state error as sensed by threshold detector 51, or an instantaneous error a sensed by threshold detector 53, which persists for a period of time determined by timer 54, or the combination of an instantaneous failure and a valid discrete indicated failure causes the output from OR gate 52 to go high and thus the output from OR gate 59 to go high. In this case, a high level at the output of OR gate 59 indicates a failure in the first equalizing channel 21. This failure would likely result from some form of failure of sensor 11.

In response to such a failure being identified, the high-level failure signal is used to activate its corresponding switch 14–16 to its alternate position. Thus, a high level out of OR gate 59, indicating a failure in channel 21, causes switch 14 to be activated to its alternate position. As seen, in its alternate position each of the switches 14–16 isolates its corresponding sensor 11–13 from the system, and in turn feeds as an input signal to its equalizer loop the midvalue selected output signal. In so doing, the median selection process continues among three signals, thereby assuring a positive subsequent failure identification.

It will be noted that the effect of substituting the midvalue selected signal out of midvalue selector 44 for the sensor signal out of one of sensors 11–13 will be for the corresponding equalizing channel 21–23 to output the midvalue selected signal. Assume, for example, that a failure causes switch 14 to switch the midvalue selector 44 produced signal to the input of summer circuit 31. Now, since summer 32 has the midvalue selected signal at both of its inputs, its output will be zero and, through limiter 33 and integrator 34, the negative input to summer circuit 31 will be zero. Thus, the midvalue selected signal wil be added to zero in summer 31 and applied to one of the inputs of midvalue selector 44. The operation of the fault detection circuitry is, therefore, to isolate a fault detected, equalized input signal from the input of the midvalue selector and substitute in its place the midvalue selector output signal.

If a second failure is identified and, thus, the compensated input signal from the failed channel isolated from the midvalue selector, an appropriate one of the switches 41–43 is activated to its alternate position. If, for example, failures have been identified, and signals isolated in channels 22 and 23, switch 41 is activated to its alternate position. Also, in response to the failure of any two channels, switch 45 activates to its alternate position, causing that compensated input which survives as the only valid signal to be routed directly as the system's selected output.

For systems wherein more than three redundant input signals are provided, the present system would be modified such that upon failure of all channels save one, the remaining valid signal would be switched directly as the selected output.

Thus, the present system is fully operational after the failure of all but one of the processing channels.

In summary, apparatus for, and a method of improved redundant signal selection and fault detection and isolation has been shown.

While a preferred embodiment of the invention has been described in detail, it should be apparent that many modifications and variations thereto are possible, all of this fall within the true spirit and scope of the invention.

I claim:

1. Apparatus for selecting one of several input signals comprising:
   a plurality of equalizer channels, each equalizer channel processing one of said input signals and compensating said signal with respect to a midvalue selected signal;

midvalue selector means having a plurality of inputs and an output, each input coupled to one of the equalizer channels for producing at its output the midvalue one of said compensated input signals; and fault detector means for identifying as a fault each compensated input signal which deviates from the midvalue selected signal by a predetermined value and, in response thereto, isolating the identified compensated input signal from said midvalue selector inputs and substituting therefor as an input to the midvalue selector the output signal from the midvalue selector, said fault detector means further comprising means for directly coupling the remaining compensated signal as the output from the signal selector apparatus responsive to the isolation of all identified compensated input signals save one from the inputs to the midvalue selector.

2. The apparatus of claim 1 wherein said fault detector means further comprises:

means for producing a signal representative of the steady-state error difference between each compensated input signal and the midvalue selected signal;

means for producing a signal representative of the instantaneous error difference between each compensated input signal and the midvalue selected signal;

static error threshold detection means for monitoring each steady-state error difference signal and identifying as a fault each input signal having a compensated value which exceeds the midvalue selected signal by a predetermined static threshold level; and dynamic error threshold detection means for monitoring each instantaneous error difference signal and identifying as a fault each input signal having a compensated value which exceeds the midvalue selected signal by a predetermined dynamic threshold level for a predetermined time period.

3. The apparatus of claim 2 wherein each equalizer channel comprises:

first summer means for summing one of said several input signals with a feedback signal to produce the compensated input signal;

second summer means for summing the compensated input signal with the midvalue selected signal to produce an error signal; and integrating means for time integrating said error signal, the resultant bias signal being coupled to said first summer as said feedback signal.

4. The apparatus of claim 3 wherein said resultant bias signal comprises said static error signal and wherein said error signal comprises said instantaneous difference signal.

5. The apparatus of claim 1 wherein each equalizer channel comprises:

first summer means for summing one of said several input signals with a feedback signal to produce the compensated input signal;

second summer means for summing the compensated input signal with the midvalue selected signal to produce an error signal; and integrating means for time integrating said error signal, the resultant bias signal being coupled to said first summer as said feeback signal.

6. The apparatus of claim 5 further comprising:

rate limiter means for predetermined limiting the rate of change of each error signal; and amplifying means for multiplying each error signal by a predetermined gain factor.

7. A method for selecting one of several input signals comprising the steps of:

(a) equalizing each input signal with respect to a midvalue selected signal and thereby producing a plurality of compensated input signals;

(b) midvalue selecting the midvalue one of said plurality of compensated input signals;

(c) identifying as a fault each compensated input signal which deviates from the midvalue selected signal by a predetermined value;

(d) isolating each fault identified compensated input signal from said midvalue selecting step (b) and substituting in its place the selected midvalue signal; and (e) providing the remaining compensated input signal as the selected output signal responsive to the condition of the isolation of all compensated input signals save one.

8. The method of claim 7 wherein step (c) comprises the steps of;

(i) producing a signal representative of the steady-state difference between each compensated input signal and the midvalue selected signal;

(ii) producing a signal representative of the instantaneous difference between each compensated input signal and the midvalue selected signal;

(iii) identifying as a fault each compensated input signal having a corresponding steady-state error difference signal which exceeds a predetermined value; and (iv) identifying as a fault each compensated input signal having a corresponding instantaneous difference signal which exceeds a predetermined value for a predetermined time period.

* * * * *